CAPACITIVE SEMI-PERMANENT MEMORY

Filed Oct. 19, 1964

3 Sheets-Sheet 1

INVENTORS
DOUGLAS R. MAURE
ALBERT D. ROSENHECK

BY Fraser and Bogucki

ATTORNEYS

INVENTORS
DOUGLAS R. MAURE
ALBERT D. ROSENHECK
BY Fraser and Bogucki
ATTORNEYS

Oct. 1, 1968 A. D. ROSENHECK ET AL 3,404,382

CAPACITIVE SEMI-PERMANENT MEMORY

Filed Oct. 19, 1964 3 Sheets-Sheet 3

INVENTORS
DOUGLAS R. MAURE
ALBERT D. ROSENHECK

BY Fraser and Bogucki

ATTORNEYS

United States Patent Office 3,404,382
Patented Oct. 1, 1968

3,404,382
CAPACITIVE SEMI-PERMANENT MEMORY

Albert D. Rosenheck, Orange, and Douglas R. Maure, South Pasadena, Calif., assignors, by mesne assignments, to Lear Siegler, Inc., Santa Monica, Calif., a corporation of Delaware Filed Oct. 19, 1964, Ser. No. 404,885
12 Claims. (Cl. 340—173)

This invention relates to read-only memories, and more particularly to high speed read-only memories using a matrix arrangement of capacitor memory elements.

Read-only memories have previously been used in telephone and data processing systems to store information that seldom or never has to be changed. They are also commonly known as fixed stores, permanent or semi-permanent memories, and sometimes as code converter matrices. Presently such read-only memories are being widely used in digital computers and data test equipment to store computer instructions in a standard operational program. The great number of standard instructions needed by modern day multi-purpose digital computers require large capacity memories which are economical but at the same time permit the stored information to be retrieved reliably at high speeds compatible with the data handling rates of other computer components. Many different types of read-only memories have been employed in the past, but the need still exists for more economical and reliable random access storage systems for the operational programs and test routines encountered in modern high speed digital computers.

Random access to a large body of stored information is most commonly provided by a matrix arrangement of individual memory elements connected between intersecting address lines and sense lines. Each intersection between an address line and a sense line constitutes a storage position for a single bit of binary information. In read-only memories a desired binary value is permanently or semi-permanently stored by either coupling or not coupling a memory element between the two intersecting lines.

Previous read-only memories have taken many different forms using different types of memory element. From the standpoint of accuracy and reliability diode matrices are preferred, but the cost of the individual diodes is excessive for a memory of any size, and the diode matrix is seldom used except for simple code converters. For this reason, most present day read-only memories avoid excessive cost by the use of low cost linear memory elements. However, the bidirectional properties of the linear elements give rise to many indirect or "sneak" paths through the matrix. A pulse on one sense line can pass back to an unselected address line and then to other sense lines which ideally should carry no pulse. This has the effect of degrading the ratio between the output signals of opposite values. As a result, costly sensing circuits are necessary to distinguish the slight differences between the opposite output values.

Whereas both capacitive and inductive memory elements have been used extensively for read-only memory matrices, capacitive memories are for the most part preferred because they are inherently faster and can be fabricated very inexpensively in compact matrix arrays using well known printed circuit techniques. For example, a capacitor matrix array of the desired storage capacity is easily fabricated in separate memory planes, each plane being a "sandwich" of two conductor patterns separated by a layer of insulating dielectric material such as Mylar. Both patterns have narrow conductors forming the address and sense lines on opposite sides. The address lines are formed parallel to one another but lie at right angles to the sense lines formed parallel to one another on the opposite side. Larger areas of conductive material that serve as the capacitor plates on opposite sides of the insulating layer are attached to the narrow conductors at set intervals along their lengths. The planes are fabricated so that all bit positions represent the same binary value, and the opposite binary value is then stored by severing the connection between one of the capacitor plates and its narrow conductor.

Previously, the size of such capacitor matrix memories was limited because as the storage capacity was enlarged the number of sneak paths in the matrix became greatly multiplied, and also because the electrical characteristics of the matrix depended upon the stored information, that is, the matrix arrangement was pattern sensitive. Ideally, when a read-out voltage is applied to one of the address lines, all the other address and sense lines should be maintained at ground potential. In that event the matrix memory would have no sneak paths and the only losses introduced by the sense lines would be due to conductor resistance and dielectric loss. In addition, the signal-to-noise ratio at the output of the matrix would be improved and, more importantly, the speed of information retrieval from the memory would be greatly increased by preventing prolonged propagation of the address drive pulses through the matrix. Heretofore, however, this ideal has not been realized or even closely approached by any previous read-only memories using linear memory components.

Therefore, it is an object of the present invention to provide an improved capacitor read-only memory.

Another object of the present invention is to provide a high speed read-only memory which uses low cost linear memory elements but is not pattern sensitive and has no sneak paths.

A further object of the present invention is to provide a low cost, random access read-only memory with an improved signal-to-noise ratio and a greatly increased information retrieval rate compatible with modern high speed computers.

These and other objects are accomplished in accordance with the invention by providing a unique capacitor matrix arrangement with address and sense line selection circuits for maintaining at ground potential all the address and sense lines except those designated, thereby virtually eliminating all sneak paths. Each memory plane, which may be fabricated by normal printed circuit techniques, has a capacitor memory element formed at each bit position, that is, at each intersection between an address line and a sense line. One plate of each capacitor is connected to a respective sense line, whereas the other capacitor plate is originally fabricated with connections to both an address line and a ground line. A binary "one" valve may then be written into the memory by breaking the connection between the capacitor plate and the ground line leaving the other connection to the address line. Conversely, a binary "zero" value is written by breaking the connection between the capacitor plate and the address line leaving the connection to the ground line. If all lines except the selected address and sense lines are maintained at ground potential, then each of the capacitor memory elements connected to the selected sense line, with the possible exception of that being interrogated, has its other plate connected to ground potential either through the ground line or through the unselected address lines. Accordingly, each sense line has a substantially constant loading factor no matter what values are stored so that the system is not pattern sensitive. With this arrangement, the output signal from the sense line to the connected sensing circuit has a standard value dependent only upon the value of the bit being sensed, regardless of other information stored in the other bit positions along the same sense line.

In accordance with another aspect of this invention, a drive circuit is provided for each address line to maintain the address line at ground potential except when an address pulse is applied. Each drive circuit has a pair of switch elements connected to the address line, one of which switches is normally closed to ground potential and the other of which is normally open. When a particular address line is selected, the normal condition of both switches, which may consist of opposite type switching transistors, is reversed to open the normally closed switch and simultaneously close the normally open switch to a driving potential source. The selected address line is thus momentarily disconnected from ground potential to be connected through the normally open switch to receive a drive pulse from the driving potential source. In the meantime, the other address lines not selected remain grounded through the normally closed switches to prevent any sneak paths.

Likewise, a bit selection circuit is associated with each sense line to selectively gate output signals, which are indicative of the binary value stored in a particular bit position, from the chosen sense line to a sensing circuit. Each sense line is connected to a junction between a pair of series connected clamping diodes, a first of which is connected directly to ground potential to pass signals of a polarity opposite that resulting from a binary one output pulse. In other words, the first diode acts to clamp the sense line to ground potential to prevent signals having the wrong polarity from reaching the sensing amplifier. The second diode of this series connected pair clamps the sense line to a ground potential level applied through a normally closed switch element, but this second diode is also connected through a dropping resistor to a potential source having the same polarity as the binary output pulse. When the switch to ground is opened, the second diode is back biased by the potential source so that the binary "one" output pulses pass from the selected sense line through a buffering device to an appropriate sensing circuit, such as a DC amplifier. Otherwise, unless selected, each sense line remains clamped to ground in both polarities through the two series connected clamping diodes.

These and other aspects of the invention may be better understood by referring to the following detailed description with the accompanying drawings, in which.

Figure 1:
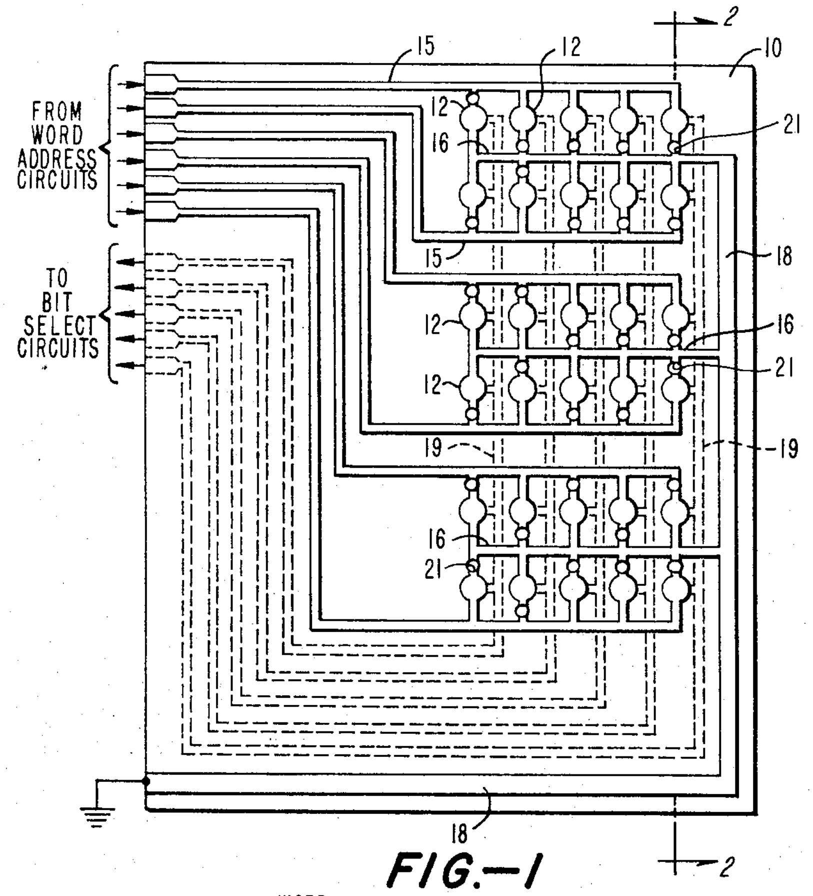
FIG. 1 is a plan view of a preferred form of a capactive read-only memory plane formed on a printed circuit board.
Figure 2:
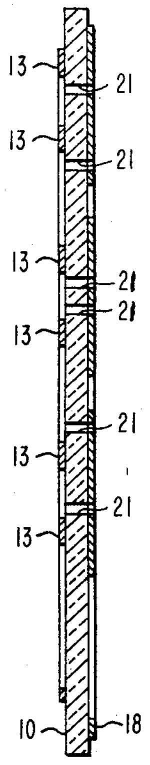
FIG. 2 is a full section side view of the capacitive read-only memory plane taken along the line 2—2 of FIG. 1.

Referring now to FIGS. 1 and 2, a read-only memory in accordance with the invention contains a desired number of capacitive memory elements arranged in two dimensional matrix arrays on separate memory planes, which may be combined into a larger capacity three dimensional storage system.

The particular method of construction may be varied in accordance with various practical considerations, but the methods described herein may be seen to have certain obvious advantages in some instances. For example, two conductive patterns are deposited by conventional printed circuit techniques on opposite sides of a printed circuit board consisting of a dielectric material such as fiber glass. Also, as another example, one of the patterns may first be deposited upon a suitable sheet of non-conductive substrate material, and then covered by a thin dielectric film such as Mylar, on which the other conductive pattern may then be deposited. The latter example is in accordance with more conventional methods of constructing previous memories of this general type.

For ease of illustration, the plate shown in FIG. 1 contains only thirty capacitive memory elements arranged in a five-by-six matrix array. The five capacitive memory elements in each horizontal row form a five-bit address word, and the corresponding bits of each addres word form vertical columns containing six capacitive memory elements each. Each memory element consists of an upper and a lower conductive plate 12 and 13 formed directly opposite one another on opposite sides of the dielectric plate 10. The upper and lower plates 12 and 13 have the same shape and size, and are shown herein as being circular, but may be of any desired shape such as square or rectangular. Each row of upper plates 12 has a separate address line 15, and, in addition, each row has an associated ground line 16. Preferably, the address and ground lines 15 and 16 are arranged as shown in FIG. 1 with address lines 15 on opposite sides of adjacent rows and the ground lines 16 running horizontally between the two rows. A common ground bus 18 connects all ground lines 16 to a common ground potential.

The pattern on the other side of the circuit board 10 contains the lower capacitor plates 13, with each column connected to a separate bit select line or sense line 19. For convenience, the word address lines 15, the sense lines 19, and the ground bus line 18 are all extended to one side of the circuit board 10 for connection to appropriate external circuits. The connecting lines in the upper and lower patterns should be arranged to minimize capacitive couplings at the crossings of the address and sense lines.

In accordance with one practical embodiment of this invention, the upper pattern is initially formed with each of the upper plates 12 connected both to its associated word address line 15 and ground line 16. The desired binary information is then stored by drilling a hole 21 through the printed circuit board 10 to break one of the two connections with the upper plate 12. For example, a binary "one" is written by drilling a hole to break the connection between the upper plate 12 and its associated ground line 16 while leaving the connection to the word address line 15. Conversely, a binary "zero" is written at another bit position by drilling the hole to break the connection between the upper plate 12 and the word address line 15 while leaving the connection to the associated ground line 16. Thus the information may be inserted into the memory planes by appropriately programming the operation of an automatic drill. Where a given information content is used extensively, as in providing standard programming formats for data processing equipment, the memory planes can be mass produced more inexpensively by conventional photographic etching processes to include the desired information. In this case, an appropriate one of the connections to each of the upper plates 12 is simply not formed as a part of the etched pattern.

Figure 3:
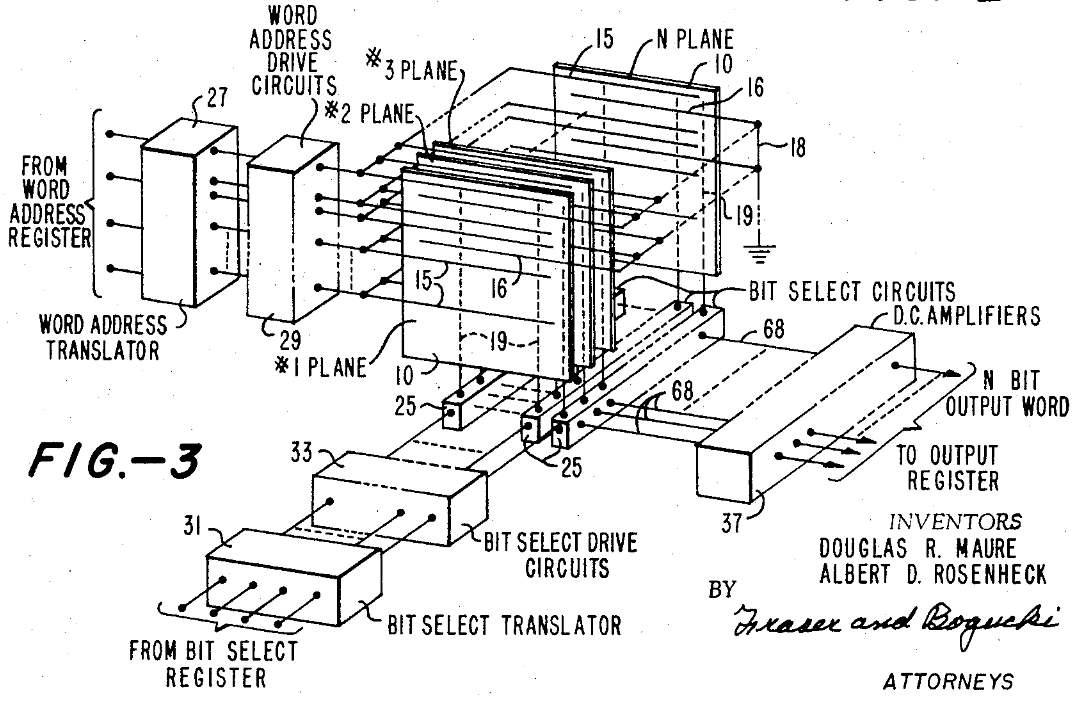
FIG. 3 is a perspective view schematically illustrating in block diagram form a multiplane capacitive read-only memory in accordance with this invention having a large storage capacity.

Referring now to FIG. 3, a typical large capacity read-only memory is formed by combining N number of memory planes such as shown in FIGS. -1 and 2 into a three-dimensional array with appropriate input and output circuitry. In this figure, the two-dimensional memory planes 10 are simplified for ease of illustration by omitting the memory elements and showing the connecting lines as straight lines.

The N number of two-dimensional memory planes shown may be stacked in an appropriate holding device (not shown) to form a three-dimensional array. Information is read out by simultaneously interrogating the same bit position in each plane 10 to produce an output word with N number of bits in parallel. A given bit position in each plane is interrogated by applying a drive pulse to its associated word address line 15 while a bit select circuit 25 connected to its associated sense line 19 is actuated. A multibit binary signal from a word address register (not shown) may be used to designate a particular one of the word address lines 15. A word address translator 27, commonly a diode decoding matrix, responds to the binary signal to actuate that one of a group of word address drive circuits 29 which is coupled to the designated word address line 15. As will be explained hereinafter, the particular word address drive circuit 29 generates a drive pulse on the selected word address line 15, while the other word address drive circuits maintain the undesignated word address drive lines 15 at ground potential.

Similarly a multibit binary signal obtained from a bit select register (not shown) may be used to designate a particular bit in the chosen address word. A bit select translator 31, normally a diode matrix decoder, responds to the binary signal to actuate that one of a group of bit select drive circuits 33 which is coupled to the bit select circuits 25 of the designated sense line 19. The output from the bit select drive circuit 33 actuates the desired bit select circuits 25 to permit output pulses indicative of the binary value stored at the interrogated bit position to reach appropriate output circuitry. During this time the other bit select circuits 25 operate to maintain their associated sense lines 19 at ground potential and thereby prevent sneak paths.

The word address lines 15 corresponding to the same address word position in each of the N memory planes 10 are connected in parallel with one another to receive simultaneously a drive pulse from an appropriate one of the word address drive circuits 29. Similarly, the bit select circuits 25 corresponding to the same bit position in each of the N memory planes 10 are connected in parallel to be controlled by the output from an appropriate one of the bit select drive circuits 33. Accordingly, an output pulse from the selected bit position on each of the N planes is selectively gated from the designated sense line 19 through the associated bit select circuit 25 in response to the designated one of the bit select drive circuits 33. The output pulses which represent the binary value stored at the selected bit position in each memory plane 10 are then applied to appropriate DC amplifiers 37. The N amplified bits comprising the output word then may be stored in parallel in an output register (not shown) for further use.

Figure 4:
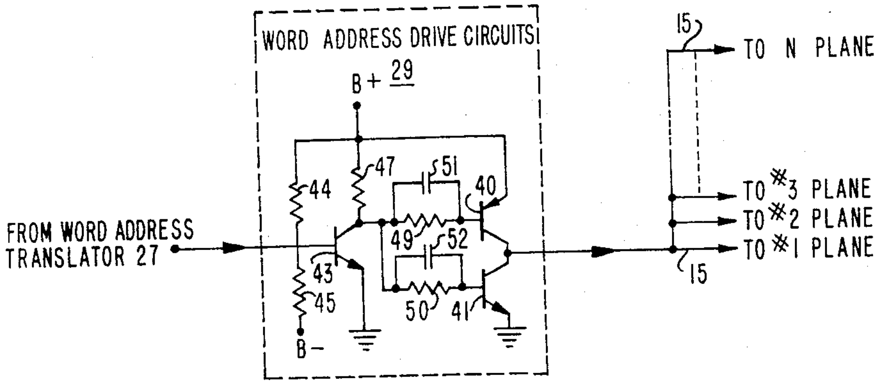
FIG. 4 is a circuit diagram of a preferred form of word address driving circuit for use in a capacitive read-only memory in accordance with this invention.

Referring now to FIG. 4, there is shown a preferred form of one of the word address drive circuits 29 for producing a drive pulse whenever the associated word address line 15 is designated but for otherwise maintaining the word address line 15 at ground potential when that address line is not designated. A pair of opposite type switching transistors 40 and 41 have their collector terminals connected together at the output terminal of the word address drive circuit 29. The PNP switching transistor 40, which is normally non-conducting, has a positive potential source B+ connected to its emitter terminal, whereas the NPN switching transistor 41 which is normally conducting has its emitter terminal connected directly to a ground potential source so that the associated word address line is normally maintained at this ground potential through the transistor 41.

Actuating pulses from the word address translator 27 are applied directly to the base of the NPN switching transistor 43 that is normally biased to non-conduction by the potential at the center terminal between a pair of voltage divider resistors 44 and 45 which are coupled in series between the positive potential source B+ and a negative potential source B−. The emitter of the switching transistor 43 is grounded and its collector is connected through a load resistor 47 to the B+ potential and through an associated driving resistor 49 or 50 to the base terminals of the respective switching transistors 40 and 41. A bypass capacitor 51 or 52 may be connected in parallel with a respective one of the driving resistors 49 or 50 so that the storage time is reduced to improve switching speeds.

In operation, this preferred form of word address drive circuit 29 can be seen to maintain the associated word address line 15 at ground potential except when a drive pulse is applied. During the time that the switching transistor 43 is normally nonconducting, the B+ potential at its collector maintains the PNP switching transistor 40 normally nonconducting and the NPN switching transistor 41 normally conducting. However, when a positive actuating pulse is received from the word address translator 27, the NPN switching transistor 43 quickly becomes conducting at or near saturation to lower the potential at its collector toward the ground potential on its emitter. This sudden drop in potential at the base of the NPN switching transistor 41 causes it to become nonconducting thus opening the previous connection of the output terminal to ground. At the same time, the transistor 40 becomes conducting to apply the B+ potential as a drive pulse to the designated address line 15. Upon removal of the actuating pulse from the word address translator 27, the transistor 43 returns to its normally nonconducting state, thus raising the potential at its collector. This returns the switching transistors 40 and 41 to their normal nonconducting and conducting states, respectively, thereby terminating the B+ drive pulse. Of course, other high speed arrangements for performing these switching functions will be obvious to those skilled in the art.

Figure 5:
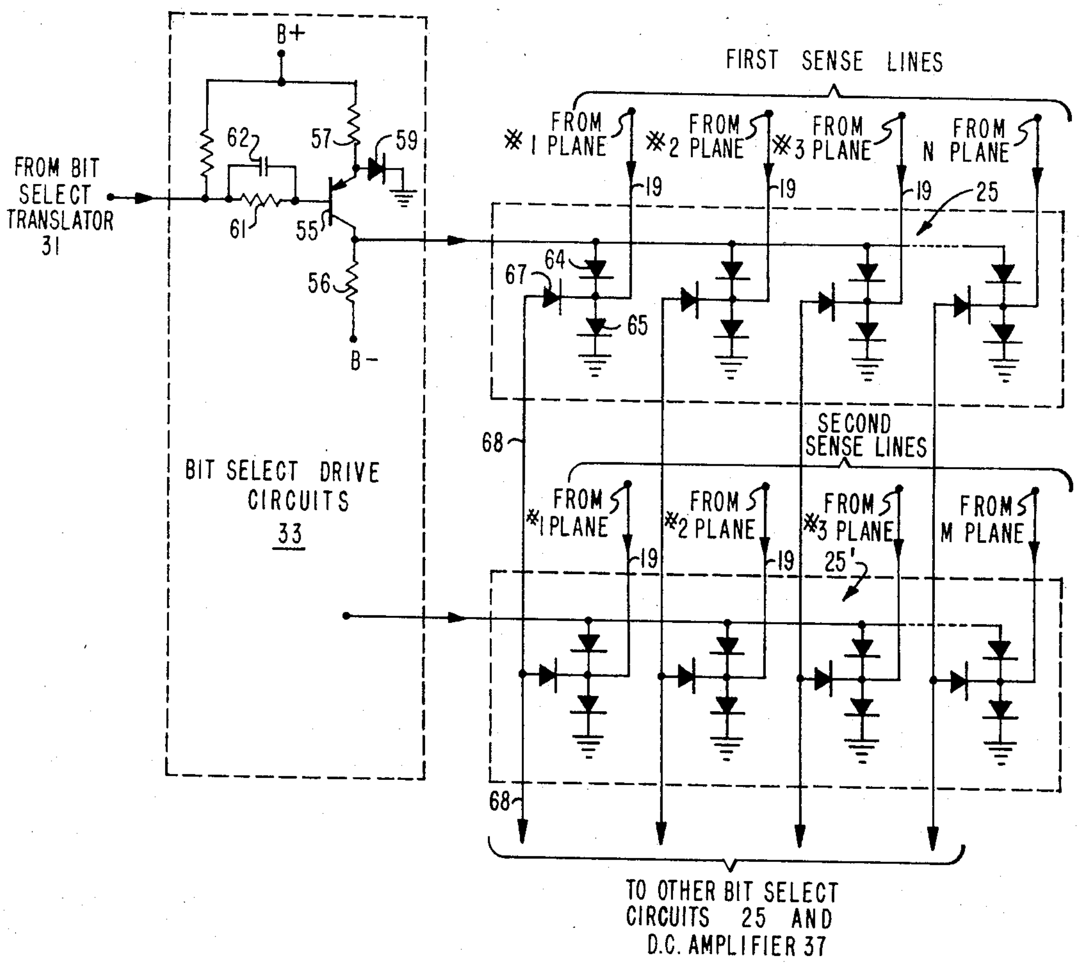
FIG. 5 is a circuit diagram of a preferred form of bit select circuit for use in a capacitive read-only memory in accordance with this invention; and, FIG. 6 is a simplified schematic circuit diagram for use in illustrating the operation of a read-only memory in accordance with the invention.

Now, referring to FIG. 5, a preferred form for the bit select drive circuits 33 and the bit select circuits 25 is shown. In order to fully explain the nature of this aspect of the invention a single bit select drive circuit 33 is shown along with its associated bit select circuit 25 and an additional bit select circuit 25' that is actuated from a different bit select drive circuit.

Each of the bit select drive circuits 33 contains a PNP switching transistor 55, the collector terminal of which is connected to the associated bit select circuit 25. The collector terminal of the switching transistor 55 is also connected through a load resistor 56 to the negative potential source B−, and its emitter terminal is coupled through a dropping resistor 57 to the positive potential source B+. The emitter terminal is connected to a clamp voltage through a diode 59 poled to conduct current from the clamp source in the forward direction. Accordingly, the potential at the emitter terminal of the transistor 55 is at clamp potential. Hence a positive potential must be applied to the base of the switching transistor 55 to switch it to its nonconductive or "off" state from its normally conducting or "on" state. During the time that the transistor 55 is normally conducting, its collector potential is slightly above ground potential.

The above-described circuit corresponds to what has become known in the switching transistor art as the basic current mode of operation. The basic current mode is usually employed to lower switching times by preventing the switching transistor from operating in the saturation region. In this instance, however, it is used primarily for maintaining the output from the bit select drive circuits 33 substantially at ground potential. The switching speed provided by the basic current mode arrangement is further enhanced by applying the positive switching pulse from the bit select translator 31 to the base of the switching transistor 55 through a drive resistor 61 which has a bypass capacitor 62 connected in parallel. When the positive switching pulse switches the transistor 55 to its nonconductive or "off" state, diode 59 maintains the emitter at clamp potential. With the transistor 55 cut off, its collector assumes the negative B— potential level, thus applying a negative polarity output voltage to the respective bit select circuit 25.

The circuit illustrated and described herein in connection with FIG. 5 assumes that a negative output pulse is to be obtained from the memory if a binary one is stored at the selected bit position. If instead a positive output pulse was to be obtained, it would be obvious to those skilled in the art that the circuit may be modified accordingly.

Each sense line 19 is connected to the junction between a pair of series connected clamping diodes 64 and 65. The diode 65 is poled to pass positive polarity signals in the forward direction to ground to prevent the sense line 19 from assuming a positive potential. The other clamping diode 64 is poled in the opposite direction to conduct signals of negative polarity that appear on the sense line 19. The associated bit select drive circuit 33 is connected to the anode of the diode 64 so that the associated sense line 19 cannot be more negative than the potential at the output of the associated bit select drive circuit 33. In other words, the sense line 19 normally is also clamped to ground potential in the negative polarity direction through the diode 64. However, when a particular bit position is designated by an actuating signal from the bit select translator 31, the negative output signal from the appropriate bit select drive circuit 33 back biases the diode 64 permitting output signals of negative plurality which are indicative of a stored binary "one" to develop on the selected sense line 19.

A buffering diode 67 poled to pass the negative polarity binary "one" output signals couples all sense lines 19 in each memory plane to an output bus 68, which is in turn coupled to the input of one of the DC amplifiers 37. In other words, all of the sense lines 19 in a given plane are connected in "OR" logical circuit fashion to the input of the respective DC amplifier 37 so that the negative output signal on the designated bit select line 19 is amplified for proper detection or storage in an output register.

Figure 6:
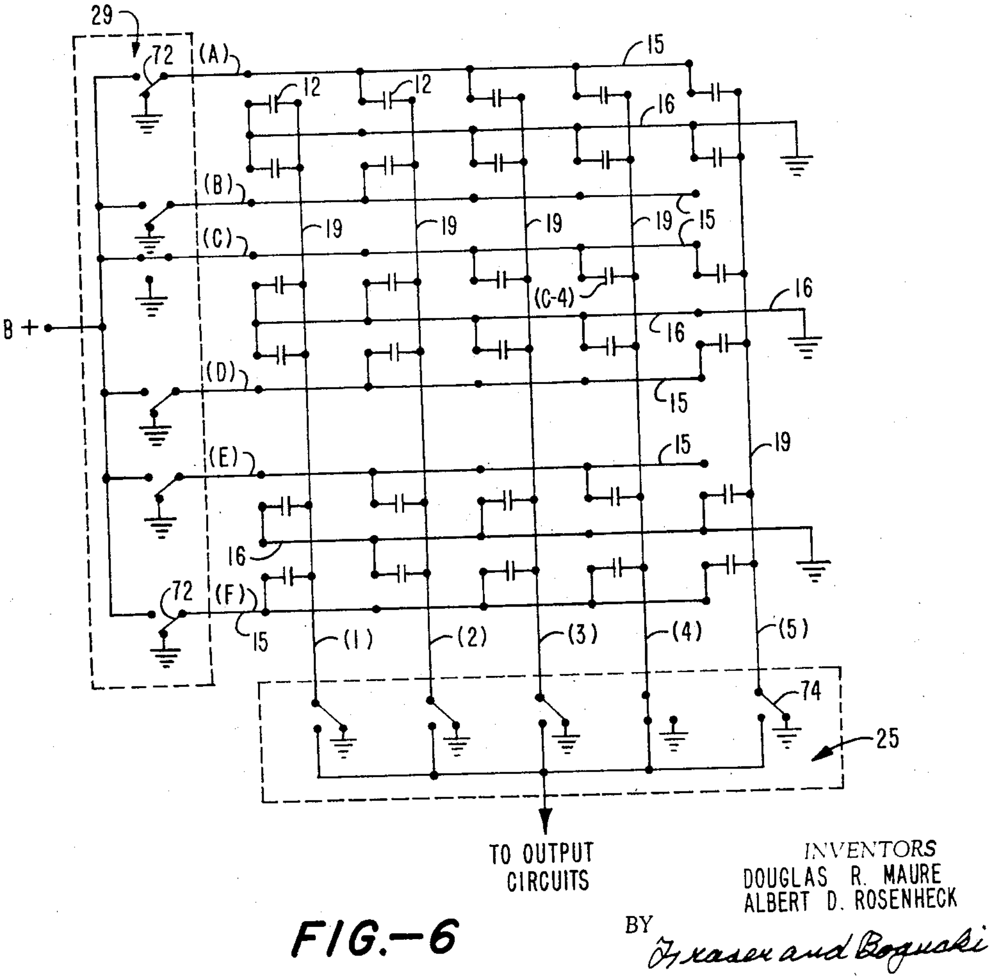

In FIG. 6 a single memory plane corresponding to that shown in FIG. 1 is shown in simplified schematic form. The associated word address drive circuits 29 and the bit select circuits 25 have been illustrated as simple two position switches in order to simplify the following explanation of the operation. Also, the capacitive memory elements 12 are shown with one plate connected to a sense line 19 while the other plate is either connected to the ground line 16 or to the address line 15 depending upon whether a binary "zero" or a binary "one" is stored. The connections shown in FIG. 6 correspond to those shown in FIG. 1 so that the stored binary values remain the same in both figures.

The six address lines are designated A to F and the five sense lines are designated 1 to 5 for easy identification. Two position movable contact switches 72 represent the word address drive circuits 29. The movable contact of each switch 72 normally connects its associated word address line 15 to a ground potential terminal but may be momentarily closed to a B+ potential terminal to apply a short duration word address drive pulse. Similarly, two position movable contact switches 74 represent the bit select circuits 25 and normally connect the associated sense line 19 to a ground potential terminal. When a particular sense line 19 is selected, the movable contact is disconnected from ground and moved to connect the sense line to an output circuit, such as the DC amplifier 37. For example, assume that the bit position C–4 is to be interrogated to determine the binary value stored there. The switch 74 on the sense line 4 has its movable element disconnected from ground to be connected to an output line, as illustrated in the figure. Also the movable contact on the switch 72 for the address line C is momentarily disconnected from ground to apply the B+ potential drive pulse to the word address line C. The word address line is connected through the capacitor 13 at the C–4 bit position to the ungrounded sense line 4 so that the applied drive pulse reaches the output circuit through the switch 74. But, this same drive pulse is also applied through the capacitive memory elements 12 located a bit positions C–3 and C–5 that also store a binary "one" by having one of their plates connected to the address word line C. But, since the unselected sense lines 3 and 5 are held at ground potential by their respective switches 74, no change of potential can occur. Thus no spurious output signal can be propagated through the matrix in sneak paths along the unselected sense lines 3 and 5.

Moreover, all the other capacitive memory elements 12 having one plate connected to the selected sense line 4 have their other plate connected to ground potential either through a ground line 16 or through an undriven address line 15 and its switch 72. Accordingly, this sense line and the others have the same impedance no matter what binary values are stored. Since all sense lines have this constant loading factor independent of the information stored in the matrix, the matrix system is not pattern sensitive, so that output signals appearing on the selected sense line 19 have substantially constant amplitudes dependent only upon the binary value stored at the bit positions being interrogated.

Moreover, since the unselected word address lines 15 are maintained at ground potential, sneak paths through them are also prevented. The elimination of sneak paths and the lack of pattern sensitivity greatly improved the signal-to-noise ratio so that low cost DC amplifiers or other output detection circuits can be used.

It should be also noted that terminating resistors are not needed on the word address lines 15 as they were in previous memories to discharge the capacitive memory elements 12. These terminating resistors that were normally approximately thirty ohms drained considerable power from the system. If higher valued terminating resistors were used to lower the power requirements, the discharge time constant was increased so that the rate at which information could be read out decreased. In the present system in accordance with this invention, the omission of the terminating resistors significantly lowers power requirements as the system impedance is almost totally capacitive. Moreover, any charge built up on the capacitive memory elements 12 by a drive pulse is promptly discharged before the next interrogation cycle when the address line 15 is returned to ground potential.

One practical embodiment of a capacitive read-only memory constructed in accordance with this invention contains a total capacity of 4096 bit positions. 16 printed circuit memory planes each have 256 bit positions in a 16 x 16 two dimensional matrix array. The upper and lower printed circuit patterns were deposited upon the opposite sides of a conventional printed circuit board 3¾ inches by 4⅝ inches consisting of fiber glass material .0025 inch thick that serves as the dielectric. Memory planes so constructed have been found to give superior performance and to reduce construction costs compared to those of more conventional construction previously used in which one pattern is first deposited on a non-conductive substrate sheet to then be covered by a dielectric film such as Mylar on which the other pattern is deposited. With the previous construction it was most difficult to deposit over such a large area a thin dielectric film of uniform thickness. Variations in the dielectric film thickness could cause difference in the capacitance of the memory elements.

While the capacitor plates 12 and 13 have been shown herein as being circular for clarity, square or rectangular plates have been used to provide the most efficient use of plate area for obtaining a given capacitance of each element. In the embodiment actually constructed, the capacitance of each element was approximately seven micro-microfarads.

Word address drive pulses of approximately one ampere were obtained using the recently developed 2N 32–52 high speed switching transistors produced by Motorola Semiconductor Products, Inc., of Phoenix, Ariz. Such high current word address drive pulses are desirable because of the large bit storage capacity. Interrogation of binary "one" bit positions produced output pulses on the associated sense lines of approximately 1.3 volts. This is to be contrasted with optimum results obtained from previous read-only capacitive memories which although having much smaller storage capacities, produced output pulses of only a few millivolts.

In the present practical example, the read-only memory attained operating speeds of a hundred nanoseconds per cycle, equally divided between a select interval and a read interval. This speed is compatible with the clock interval and operating speeds of most modern computer and data processing equipment. Even shorter memory cycles are possible since the ultimate operating speed is only limited by the switching speed of the switching elements used in the word address and bit select drive circuits.

Although a preferred embodiment of the invention has been described and illustrated herein, it will be understood that various changes, modifications and equivalent arrangements may be employed without departing from the scope of the invention as expressed in the appended claims.

What is claimed is:

1. A read-only memory wherein the individual memory elements consist of first and second capacitor plates separated by a dielectric material arranged in a matrix array along individual rows and columns, comprising: a separate address line associated with each row for connection to the first plate of selected ones of the memory elements to store a given binary value; a separate sense line for each column of memory elements connected to the second capacitor plate of each memory element in the column; a ground potential source; a drive potential source; switch means coupled to each address line for normally maintaining all the address lines connected to the ground potential source when not actuated; means for momentarily actuating one of said switch means to connect the associated address line to the drive potential source to apply a short duration drive pulse; clamping means connecting each sense line to the ground potential source for normally maintaining each sense line at ground potential; means for selectively back biasing one of said clamping means to disconnect a selected one of said sense lines from the ground potential source; and output means connected to each of the sense lines to receive output pulses induced on the selected one of the sense lines by a drive pulse from the drive potential source.

2. The capacitive read-only memory of claim 1 wherein said switch means coupled to each address line comprises: a first switching element coupling the address line to the ground potential source; a second switching element coupling the address line to the drive potential source; both said first and said second switching elements being responsive to applied signals for closing or opening a conductive path to the address line from their respective potential sources; means for applying a bias signal for maintaining said first switching element closed to the ground potential source and said second switching element open; and means responsive to the means for momentarily actuating one of said switch means for generating a short duration switching signal to each of said switching elements to open said first switching element and close said second switching element to the drive potential source.

3. The capacitive read-only memory of claim 1 wherein said clamping means comprises: a first clamping diode coupling the respective sense line to the ground potential source to pass signals that may appear on the sense lines having a plurality opposite that of the output pulses; circuit means responsive to said back biasing means for generating a clamping control signal output having a given potential level of the same polarity as the output pulses and for otherwise maintaining a ground potential output; and a second clamping diode connecting the sense line to said clamping control signal circuit means output to pass signals of the same polarity as said output pulses so that the respective sense line is clamped to ground potential in both polarities when the clamping control signal means has a ground potential output and so that the output pulses may pass to said output means on the respective sense line when said second clamping diode is back biased by the clamping control signal output generated in response to said back biasing means.

4. A capacitive read-only memory wherein the individual memory elements consist of first and second capacitor plates separated by a dielectric material arranged in a matrix array along individual rows and columns, comprising: a separate address line associated with each row of memory elements adapted to be connected to the first plates of each memory element for storing a first binary value; a ground line adapted to be connected to the first plate of each of the individual memory elements to store a second binary value; means conductively connecting the first plate of each of the individual memory elements either to one of said address lines or to said ground line in accordance with the binary value to be stored; a ground potential source connected to said ground line; address means coupled to each address line for normally maintaining all the address lines at ground potential and for selectively applying a drive pulse to one of said address lines while maintaining the others at the potential of the ground potential source; a separate sense line for each column of memory elements connected to the second capacitor plate of each memory element in the column; output means; means for selectively connecting one of said sense lines to said output means when a drive pulse is applied to a selected one of the address lines to produce an output signal indicative of the binary value stored in a selected one of the individual memory elements.

5. A capacitive read-only memory wherein the individual memory elements consist of first and second capacitor plates separated by a dielectric material and wherein the individual memory elements are arranged in a matrix array along individual rows and columns, comprising: a separate address line associated with each row of memory elements adapted for connection to the first plate of selected ones of individual memory elements to store a first binary value; a ground line connected to the first capacitor plate of those memory elements not connected to their associated address line for storing a second binary value; and a separate sense line for each column of memory elements connected to the second capacitor plate of each memory element in the column; and circuit means for applying a drive pulse to a selected one of said address lines and for permitting an output signal to appear on a selected one of said sense lines while maintaining all the other address and sense lines and the ground line at a ground potential.

6. A capacitive read-only memory comprising: a sheet of dielectric material; a plurality of individual memory elements consisting of first and second capacitor plates separated by the sheet of dielectric material; a plurality of address lines on one side of the sheet arranged for connection to each of the first capacitor plates; a plurality of sense lines on the opposite side of the sheet, each of said second capacitor plates being connected to one of said sense lines, said plurality of individual memory elements being arranged in a matrix array along said address and sense lines; and ground lines on said one side of the sheet also arranged for connection to each of the first capacitor plates whereby each first capacitor plate can be connected either to an associated one of the address lines or to an associated ground line depending upon the binary value to be stored in the read-only memory.

7. A three-dimensional matrix memory for storing binary data bits in individual capacitive memory elements comprising: separate memory planes each having a number of individual memory elements, each memory plane consisting of a sheet of dielectric material; first and second conductive patterns deposited on opposite sides of the sheet, said first conductive pattern consisting of first capacitor plates, one for each individual memory element, arranged along horizontal rows and vertical columns, a horizontal ground line deposited between each pair of rows of first capacitor plates, a separate horizontal address line associated with each row of first capacitor plates deposited above and below each pair of rows opposite the ground line in between, and conductive strips deposited to connect each first capacitor plate either to its associated ground line or to its associated address line, said second conductive pattern consisting of second capacitor plates deposited on said sheet opposite said first capacitor plates along identical horizontal rows and vertical columns, vertical sense lines deposited adjacent each column of second capacitor plates, and conductive strips connecting each second capacitor plate to its associated sense line; a plurality of drive circuits each connected to apply to drive pulse to a corresponding address line in each memory plane upon being actuated and for otherwise maintaining the connected address lines at a ground potential; means for selectively actuating one of said plurality of drive circuits; means for maintaining all of said ground lines at the ground potential; a plurality of gating circuits each connected to a respective one of said sense lines to pass an otuput pulse induced by applying a drive pulse from the associated address line to the first capacitor plate of a memory element whose second capacitor plate is connected to the respective sense line; a plurality of control circuits each being connected to control all of said gating circuits connected to the corresponding ones of said sense lines in each memory plane; a separate output circuit for each memory plane; and buffering means connecting each of the selection circuits associated with the sense lines of a respective memory plane in parallel to the associated output circuit.

8. In a memory device for storing binary information having individual capacitive memory elements with first and second capacitor plates, the second capacitive plate of each memory element being connected along with the second capacitive plates of certain others of the memory elements to a respective sense line in a matrix array, comprising: address means for generating a pulse to interrogate a selected one of the memory elements connected to a designated sense line; means for connecting the first capacitive plate of the memory elements to the address means to indicate a first binary value and for connecting the first capacitive plate of the remaining memory elements to a ground potential to indicate a secondary binary value; and means responsive to the operation of the address means for maintaining at ground potential the first capacitive plate of each unselected memory element which has its second capacitive plate connected to the designated sense line while the selected memory element is being interrogated by a pulse from the address means, whereby the signal appearing on the respective sense line due to a pulse from the address means is independent of the binary values stored by the unselected capacitive memory elements.

9. An information storage device for storing binary information in which a selected binary value is stored at each bit position identified by the intersection of orthogonally disposed address and sense lines, comprising: a separate linear impedance element for each bit position for coupling the associated sense line to the associated address line to indicate a first binary value; means for applying an interrogating signal to a selected one of the address lines; means establishing a ground potential source, each linear impedance element indicative of the other binary value being connected to couple the respective sense line to the ground potential source means; and means for maintaining the unselected address lines at ground potential during application of the interrogating signal to the selected address line, whereby each sense line has a constant characteristic impedance regardless of the binary values being stored in the bit positions at the intersections with the unselected address lines.

10. The storage device of claim 9 further comprising: output means for receiving signals appearing on said sense lines; and selection means for coupling a selected one of the sense lines to the output means while maintaining the remaining sense lines at ground potential during application of an interrogating signal, whereby said output means receives a signal indicative of the binary value stored at the bit position corresponding to the intersection of the selected address line with the selected sense line.

11. The method of storing and retrieving information from a memory matrix in which individual capacitive memory elements are arranged in rows and columns along respective address and sense lines comprising: coupling a first plate of each capacitive memory element to its respective address line to store a first binary value; coupling the first plate of each other capacitive memory element to a ground potential source to indicate a second binary value; and interrogating a selected address line by applying a pulse while maintaining the unselected address lines at ground potential whereby each sense line maintains a constant loading factor.

12. The method of claim 11 further comprising: selecting one of the sense lines in conjunction with the selection of the address line to identify a particular bit position; connecting the sense line to deliver signals resulting from an interrogating signal being passed through a capacitive memory element coupled between the selected address line and the selected sense line at the particular bit position to an output device while maintaining the unselected sense lines at ground potential thereby preventing any sneak paths.

No references cited.

TERRELL W. FEARS, *Primary Examiner.*